United States Patent
Lee et al.

(10) Patent No.: US 8,758,188 B2
(45) Date of Patent: Jun. 24, 2014

(54) PLANETARY GEAR TRAIN OF AUTOMATIC TRANSMISSION FOR VEHICLES

(71) Applicant: Hyundai Motor Company, Seoul (KR)

(72) Inventors: Chang Wook Lee, Suwon-si (KR); Kangsoo Seo, Yongin-si (KR); Myonghoon Noh, Seongnam-si (KR); Jae Chang Kook, Hwaseong-si (KR); Hyukjun Lee, Yongin-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/060,115

(22) Filed: Oct. 22, 2013

(65) Prior Publication Data

US 2014/0113764 A1    Apr. 24, 2014

(30) Foreign Application Priority Data

Oct. 24, 2012    (KR) .................. 10-2012-0118709

(51) Int. Cl.
*F16H 3/44* (2006.01)

(52) U.S. Cl.
USPC ........................................... 475/280

(58) Field of Classification Search
USPC ......... 475/288, 185, 296, 214, 302, 275, 311, 475/330, 284, 271, 269
See application file for complete search history.

(56) References Cited

U.S. PATENT DOCUMENTS

| | | | |
|---|---|---|---|
| 6,273,838 B1 * | 8/2001 | Park | 475/280 |
| 7,883,440 B2 * | 2/2011 | Phillips et al. | 475/275 |
| 8,100,801 B2 * | 1/2012 | Wittkopp et al. | 475/5 |

FOREIGN PATENT DOCUMENTS

| | | |
|---|---|---|
| JP | 2998941 B2 | 11/1999 |
| JP | 2010-236562 A | 10/2010 |
| KR | 0183075 B1 | 4/1999 |
| KR | 10-1172304 B1 | 8/2012 |

* cited by examiner

*Primary Examiner* — David D Le
*Assistant Examiner* — David J Hlavka
(74) *Attorney, Agent, or Firm* — Morgan, Lewis & Bockius LLP

(57) ABSTRACT

A planetary gear train may include input shaft, output shaft, first planetary gear set disposed on the input shaft and including first rotation element selectively connected to the input shaft or transmission housing, second rotation element selectively connected to the input shaft or the transmission housing, and third rotation element connected to the output shaft, second planetary gear set disposed on the output shaft and including fourth rotation element selectively connected to the input shaft and connected to the first rotation element, fifth rotation element connected to the third rotation element and directly connected to the output shaft, and sixth rotation element selectively connected to the input shaft, three transfer gears, and six frictional elements including four clutches selectively connecting the first, second, fourth, and sixth rotation elements to the input shaft and two brakes selectively connecting the first and second rotation elements to the transmission housing respectively.

19 Claims, 12 Drawing Sheets

FIG. 2

|      | C1 | C2 | C3 | C4 | B1 | B2 | gear ratio |
|------|----|----|----|----|----|----|------------|
| 1ST  | ●  |    |    |    | ●  |    | 5.064      |
| 2ND  | ●  |    |    |    |    | ●  | 2.899      |
| 3RD  | ●  | ●  |    |    |    |    | 2.185      |
| 4TH  | ●  |    |    | ●  |    |    | 1.691      |
| 5TH  | ●  |    |    | ●  |    |    | 1.305      |
| 6TH  |    |    | ●  | ●  |    |    | 1.000      |
| 7TH  |    | ●  |    | ●  |    |    | 0.848      |
| 8TH  |    |    |    | ●  |    | ●  | 0.752      |
| REV  |    | ●  |    |    | ●  |    | -6.623     |

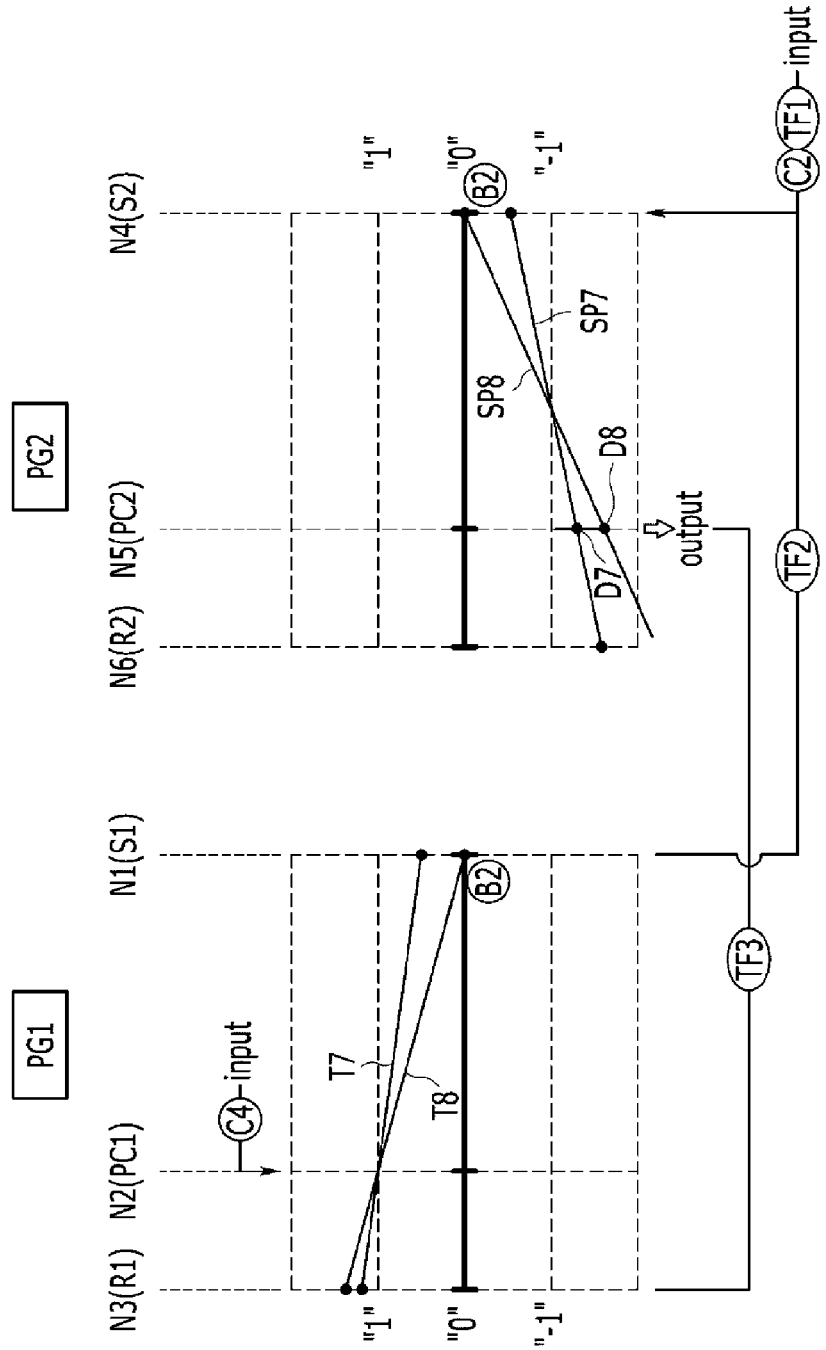

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2012-0118709 filed on Oct. 24, 2012, the entire contents of which is incorporated herein for all purposes by this reference.

BACKGROUND OF THE INVENTION

1. Field of the Invention

The present invention relates to an automatic transmission for a vehicle. More particularly, the present invention relates to a planetary gear train of an automatic transmission for a vehicle that can improve power delivery performance and mountability and reduce fuel consumption.

2. Description of Related Art

Typically, a planetary gear train is realized by combining a plurality of planetary gear sets and friction members. It is well known that when a planetary gear train realizes a greater number of shift speeds, speed ratios of the planetary gear train can be more optimally designed, and therefore a vehicle can have economical fuel mileage and better performance. For that reason, the planetary gear train that is able to realize more shift speeds is under continuous investigation.

Though achieving the same number of speeds, the planetary gear train has a different operating mechanism according to a connection between rotation elements (i.e., sun gear, planet carrier, and ring gear). In addition, the planetary gear train has different features such a durability, power delivery efficiency, and size depend on the layout thereof. Therefore, designs for a combining structure of a gear train are also under continuous investigation.

If the number of shift-speeds, however, increases, the number of components in the automatic transmission also increases. Therefore, mountability, cost, weight and power delivery efficiency may be deteriorated.

Particularly, since the planetary gear train having a number of components is hard to be mounted in a front wheel drive vehicle, researches for minimizing the number of components have been developed.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle having advantages of improving mountability by minimizing a length thereof and the number of components as a consequence of achieving eight forward speeds and one reverse speed by disposing each of two planetary gear sets respectively on an input shaft and an output shaft disposed in parallel with each other and connecting the input shaft, the output shaft, and the two planetary gear sets by a plurality of externally-meshed gears.

In addition, various aspects of the present invention are directed to providing a planetary gear train of an automatic transmission for a vehicle having further advantages of enabling of setting optimum gear ratios due to ease of changing gear ratios by using a plurality of externally-meshed gears, and accordingly improving power delivery performance and fuel economy.

In an aspect of the present invention, a planetary gear train of an automatic transmission for a vehicle, may include an input shaft receiving torque of an engine, an output shaft outputting changed torque, a first planetary gear set disposed on the input shaft, and including a first rotation element selectively connected to the input shaft or a transmission housing, a second rotation element selectively connected to the input shaft or the transmission housing, and a third rotation element connected to the output shaft, a second planetary gear set disposed on the output shaft, and including a fourth rotation element selectively connected to the input shaft and connected to the first rotation element, a fifth rotation element connected to the third rotation element and directly connected to the output shaft, and a sixth rotation element selectively connected to the input shaft, three transfer gears meshing externally the fourth, fifth, and sixth rotation elements of the second planetary gear set with the input shaft and the first and third rotation elements, and six frictional elements including four clutches selectively connecting the first, second, fourth, and sixth rotation elements to the input shaft and two brakes selectively connecting the first and second rotation elements to the transmission housing respectively.

The first planetary gear set is a single pinion planetary gear set wherein the first rotation element is a first sun gear, the second rotation element is a first planet carrier, and the third rotation element is a first ring gear, wherein the second planetary gear set is a single pinion planetary gear set wherein the fourth rotation element is a second sun gear, the fifth rotation element is a second planet carrier, and the sixth rotation element is a second ring gear.

The three transfer gears may include a first transfer gear including a first transfer drive gear connected to the input shaft and a first transfer driven gear selectively connected to the fourth or sixth rotation elements, a second transfer gear including a second transfer drive gear connected to the first rotation element and a second transfer driven gear connected to the fourth rotation element, and a third transfer gear including a third transfer drive gear connected to the third rotation element and a third transfer driven gear connected to the fifth rotation element.

The third transfer gear is connected to the output shaft.

The six frictional elements may include a first clutch disposed between the sixth rotation element and the first transfer gear, a second clutch disposed between the fourth rotation element and the first transfer gear, a third clutch disposed between the input shaft and the first rotation element, a fourth clutch disposed between the input shaft and the second rotation element, a first brake disposed between the second rotation element and the transmission housing, and a second brake disposed between the first rotation element and the transmission housing.

The second brake is disposed between the second transfer gear and the transmission housing.

A first forward speed is achieved by operating the first clutch and the first brake, a second forward speed is achieved by operating the first clutch and the second brake, a third forward speed is achieved by operating the first clutch and the second clutch, a fourth forward speed is achieved by operating the first clutch and the third clutch, a fifth forward speed is achieved by operating the first clutch and the fourth clutch, a sixth forward speed is achieved by operating the third clutch and the fourth clutch, a seventh forward speed is achieved by operating the second clutch and the fourth clutch, an eighth forward speed is achieved by operating the fourth clutch and the second brake, and a reverse speed is achieved by operating the second clutch and the first brake.

The six frictional elements may include a first clutch disposed between the sixth rotation element and the first transfer gear, a second clutch disposed between the fourth rotation element and the first transfer gear, a third clutch disposed between the input shaft and the first rotation element, a fourth clutch disposed between the input shaft and the second rotation element, a first brake disposed between the second rotation element and the transmission housing, and a second brake disposed between the fourth rotation element and the transmission housing.

The first planetary gear set is a single pinion planetary gear set wherein the first rotation element is a first sun gear, the second rotation element is a first planet carrier, and the third rotation element is a first ring gear, and the second planetary gear set is a double pinion planetary gear set wherein the fourth rotation element is a second sun gear, the fifth rotation element is a second ring gear, and the sixth rotation element is a second planet carrier.

In another aspect of the present invention, a planetary gear train of an automatic transmission for a vehicle, may include an input shaft receiving torque of an engine, an output shaft outputting changed torque, a first planetary gear set disposed on the input shaft, and including a first rotation element selectively connected to the input shaft or a transmission housing, a second rotation element selectively connected to the input shaft or the transmission housing, and a third rotation element connected to the output shaft, a second planetary gear set disposed on the output shaft, and including a fourth rotation element selectively connected to the input shaft and connected to the first rotation element, a fifth rotation element connected to the third rotation element and directly connected to the output shaft, and a sixth rotation element selectively connected to the input shaft, a first transfer gear including a first transfer drive gear connected to the input shaft and a first transfer driven gear selectively connected to the fourth or sixth rotation elements, a second transfer gear including a second transfer drive gear connected to the first rotation element and a second transfer driven gear connected to the fourth rotation element, a third transfer gear including a third transfer drive gear connected to the third rotation element and a third transfer driven gear connected to the fifth rotation element, a first clutch disposed between the sixth rotation element and the first transfer gear, a second clutch disposed between the fourth rotation element and the first transfer gear, a third clutch disposed between the input shaft and the first rotation element, a fourth clutch disposed between the input shaft and the second rotation element, a first brake disposed between the second rotation element and the transmission housing, and a second brake disposed between the first rotation element and the transmission housing.

The third transfer driven gear is connected to the output shaft.

The first planetary gear set is a single pinion planetary gear set wherein the first rotation element is a first sun gear, the second rotation element is a first planet carrier, and the third rotation element is a first ring gear, and the second planetary gear set is a single pinion planetary gear set wherein the fourth rotation element is a second sun gear, the fifth rotation element is a second planet carrier, and the sixth rotation element is a second ring gear.

The first planetary gear set is a single pinion planetary gear set wherein the first rotation element is a first sun gear, the second rotation element is a first planet carrier, and the third rotation element is a first ring gear, and the second planetary gear set is a double pinion planetary gear set wherein the fourth rotation element is a second sun gear, the fifth rotation element is a second ring gear, and the sixth rotation element is a second planet carrier.

A first forward speed is achieved by operating the first clutch and the first brake, a second forward speed is achieved by operating the first clutch and the second brake, a third forward speed is achieved by operating the first clutch and the second clutch, a fourth forward speed is achieved by operating the first clutch and the third clutch, a fifth forward speed is achieved by operating the first clutch and the fourth clutch, a sixth forward speed is achieved by operating the third clutch and the fourth clutch, a seventh forward speed is achieved by operating the second clutch and the fourth clutch, an eighth forward speed is achieved by operating the fourth clutch and the second brake, and a reverse speed is achieved by operating the second clutch and the first brake.

In further another aspect of the present invention, a planetary gear train of an automatic transmission for a vehicle, may include an input shaft receiving torque of an engine, an output shaft outputting changed torque, a first planetary gear set disposed on the input shaft, and including a first rotation element selectively connected to the input shaft or a transmission housing, a second rotation element selectively connected to the input shaft or the transmission housing, and a third rotation element connected to the output shaft, a second planetary gear set disposed on the output shaft, and including a fourth rotation element selectively connected to the input shaft and connected to the first rotation element, a fifth rotation element connected to the third rotation element and directly connected to the output shaft, and a sixth rotation element selectively connected to the input shaft, a first transfer gear including a first transfer drive gear connected to the input shaft and a first transfer driven gear selectively connected to the fourth or sixth rotation elements, a second transfer gear including a second transfer drive gear connected to the first rotation element and a second transfer driven gear connected to the fourth rotation element, and a third transfer gear including a third transfer drive gear connected to the third rotation element and a third transfer driven gear connected to the fifth rotation element, a first clutch disposed between the sixth rotation element and the first transfer gear, a second clutch disposed between the fourth rotation element and the first transfer gear, a third clutch disposed between the input shaft and the first rotation element, a fourth clutch disposed between the input shaft and the second rotation element, a first brake disposed between the second rotation element and the transmission housing, and a second brake disposed between the fourth rotation element and the transmission housing.

The third transfer driven gear is connected to the output shaft.

The first planetary gear set is a single pinion planetary gear set wherein the first rotation element is a first sun gear, the second rotation element is a first planet carrier, and the third rotation element is a first ring gear, and the second planetary gear set is a single pinion planetary gear set wherein the fourth rotation element is a second sun gear, the fifth rotation element is a second planet carrier, and the sixth rotation element is a second ring gear.

The first planetary gear set is a single pinion planetary gear set wherein the first rotation element is a first sun gear, the second rotation element is a first planet carrier, and the third rotation element is a first ring gear, and the second planetary gear set is a double pinion planetary gear set wherein the fourth rotation element is a second sun gear, the fifth rotation element is a second ring gear, and the sixth rotation element is a second planet carrier.

A first forward speed is achieved by operating the first clutch and the first brake, a second forward speed is achieved by operating the first clutch and the second brake, a third forward speed is achieved by operating the first clutch and the second clutch, a fourth forward speed is achieved by operating the first clutch and the third clutch, a fifth forward speed is achieved by operating the first clutch and the fourth clutch, a sixth forward speed is achieved by operating the third clutch and the fourth clutch, a seventh forward speed is achieved by operating the second clutch and the fourth clutch, an eighth forward speed is achieved by operating the fourth clutch and the second brake, and a reverse speed is achieved by operating the second clutch and the first brake.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of friction members at each shift-speed applied to a planetary gear train according to the various exemplary embodiments of the present invention.

FIG. 3G is a lever diagram of a planetary gear train at the eighth forward speed according to the various exemplary embodiments of the present invention.

Figure 1:
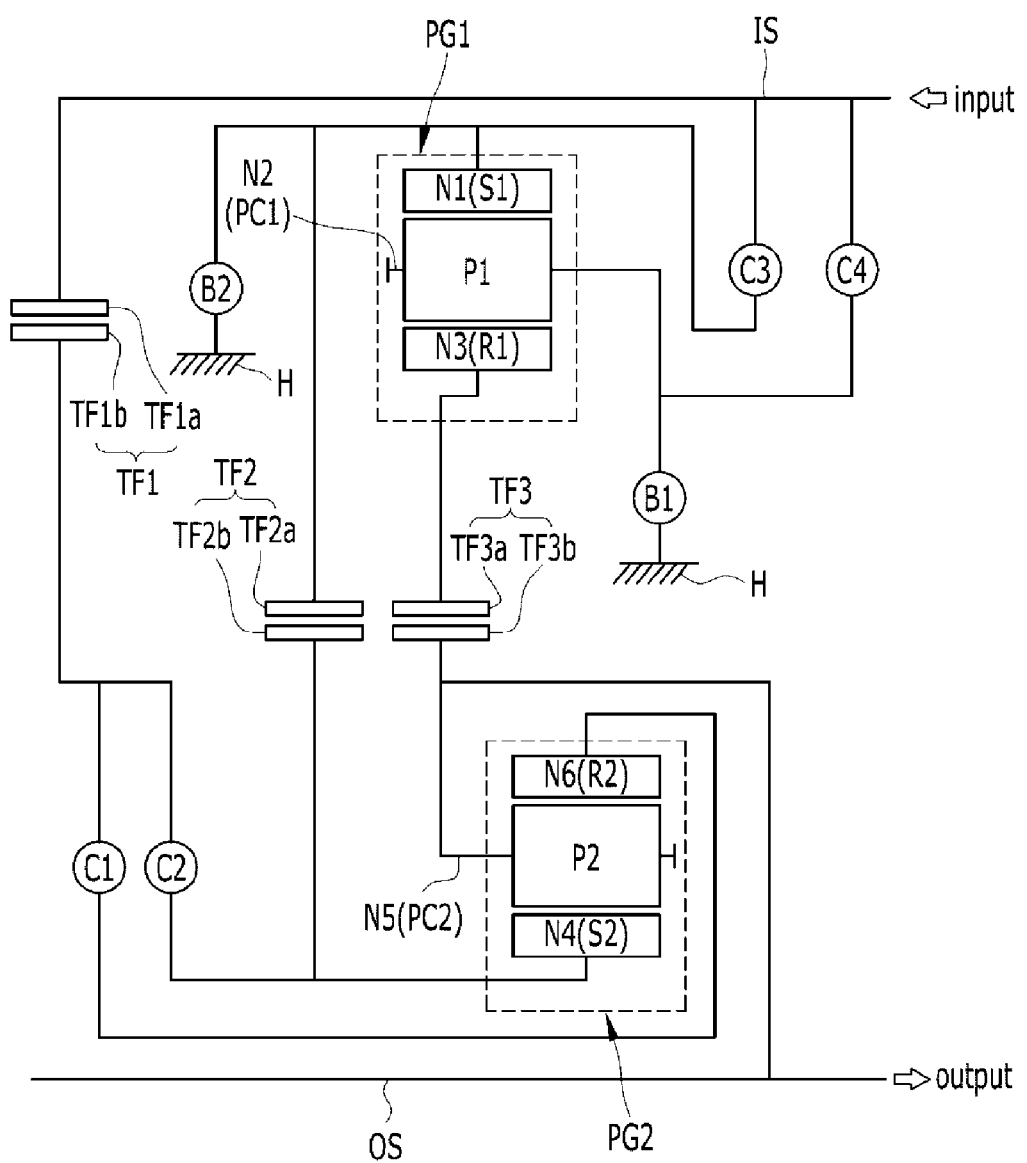
FIG. 1 is a schematic diagram of a planetary gear train according to the various exemplary embodiments of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, but have no ordinal meanings.

FIG. 1 is a schematic diagram of a planetary gear train according to the first exemplary embodiment of the present invention.

Referring to FIG. 1, a planetary gear train according to the first exemplary embodiment of the present invention includes a first planetary gear set PG1 disposed on an input shaft IS, a second planetary gear set PG2 disposed on an output shaft OS disposed in parallel with the input shaft IS, friction elements including four clutches C1, C2, C3, and C4 and two brakes B1 and B2.

Therefore, torque input to the input shaft IS is converted into eight forward speeds and one reverse speed by operations of the first and second planetary gear sets PG1 and PG2, and then is output through the output shaft OS.

The input shaft IS is an input member, and torque from a crankshaft of the engine is changed through a torque converter and is input to the input shaft IS.

The output shaft OS is an output member and delivers driving torque so as to run driving wheels through a differential apparatus.

The first planetary gear set PG1 is a single pinion planetary gear set, and includes a first rotation element N1 of a first sun gear S1, a second rotation element N2 of a first planet carrier PC1 rotatably supporting a first pinion P1 externally meshed with the first sun gear S1, and a third rotation element N3 of a first ring gear R1 internally meshed with the first pinion P1.

The second planetary gear set PG2 is a single pinion planetary gear set, and includes a fourth rotation element N4 of a second sun gear S2, a fifth rotation element N5 of a second planet carrier PC2 rotatably supporting a second pinion P2 externally meshed with the second sun gear S2, and a sixth rotation element N6 of a second ring gear R2 internally meshed with the second pinion P2.

Two rotation elements of the first planetary gear set PG1 are selectively connected to the input shaft IS, three rotation elements of the second planetary gear set PG2 are connected to the input shaft IS and two rotation elements of the first planetary gear set PG1 through first, second, and third transfer gears TF1, TF2, and TF3, and any one rotation element of the second planetary gear set PG2 is directly connected to the output shaft OS.

The first, second, and third transfer gears TF1, TF2, and TF3 respectively have first, second, and third transfer drive gears TF1a, TF2a, and TF3a and first, second, and third transfer driven gears TF1b, TF2b, and TF3b externally meshed with each other.

The first transfer gear TF1 connects the input shaft IS with the fourth and sixth rotation elements N4 and N6.

The second transfer gear TF2 connects the first rotation element N1 with the fourth rotation element N4.

The third transfer gear TF3 connects the third rotation element N3 with the fifth rotation element N5.

The first shaft IS1 or rotation elements of the first planetary gear set PG1 and rotation elements of the second planetary gear set PG2 connected by the first, second, and third transfer gears TF1, TF2, and TF3 are rotated in opposite directions to each other according to each gear ratio.

In addition, four clutches C1, C2, C3, and C4 selectively connecting the input shaft IS with the selected rotation elements and two brakes B1 and B2 selectively connecting the selected rotation elements with a transmission housing H are disposed as follows.

The first clutch C1 is disposed between the first transfer gear TF1 and the sixth rotation element N6.

The second clutch C2 is disposed between the first transfer gear TF1 and the fourth rotation element N4.

The third clutch C3 is disposed between the input shaft IS and the first rotation element N1.

The fourth clutch C4 is disposed between the input shaft IS and the second rotation element N2.

The first brake B1 is disposed between the second rotation element N2 and the transmission housing H.

The second brake B2 is disposed between the first rotation element N1 and the transmission housing H.

In addition, the friction elements including the first, second, third, and fourth clutches C1, C2, C3, and C4 and the first and second brakes B1 and B2 can be implemented as conventional multi-plate friction elements of wet type that are operated by hydraulic pressure.

FIG. 2 is an operational chart of friction elements at each shift-speed applied to a planetary gear train according to the first exemplary embodiment of the present invention.

As shown in FIG. 2, two frictional elements are operated at each shift-speed in the planetary gear train according to the first exemplary embodiment of the present invention.

A first forward speed 1ST is achieved by operating the first clutch C1 and the first brake B1.

A second forward speed 2ND is achieved by operating the first clutch C1 and the second brake B2.

A third forward speed 3RD is achieved by operating the first clutch C1 and the second clutch C2.

A fourth forward speed 4TH is achieved by operating the first clutch C1 and the third clutch C3.

A fifth forward speed 5TH is achieved by operating the first clutch C1 and the fourth clutch C4.

A sixth forward speed 6TH is achieved by operating the third clutch C3 and the fourth clutch C4.

A seventh forward speed 7TH is achieved by operating the second clutch C2 and the fourth clutch C4.

An eighth forward speed 8TH is achieved by operating the fourth clutch C4 and the second brake B2.

A reverse speed REV is achieved by operating the second clutch C2 and the first brake B1.

FIG. 3A to FIG. 3H are lever diagrams of the planetary gear train at each shift-speed according to the first exemplary embodiment of the present invention, and illustrate shift processes of the planetary gear train according to the first exemplary embodiment of the present invention by lever analysis method.

Referring to FIG. 3A to FIG. 3H, three vertical lines of the first planetary gear set PG1 are set as the third, second, and first rotation elements N3, N2, and N1 from the left to the right, and three vertical lines of the second planetary gear set PG2 are set as the sixth, fifth, and fourth rotation elements N6, N5, and N4 from the left to the right.

In addition, a middle horizontal line represents a rotation speed of "0", an upper horizontal line represents a rotation speed of "1.0", and a lower horizontal line represents a rotation speed of "−1.0".

"−" means that rotational elements is rotated in an opposite direction of a rotational direction of the engine. It is because the first shaft IS1 and the first planetary gear set PG1 are externally meshed with the second planetary gear set PG2 through the first, second, and third transfer gears TF1, TF2, and TF3 without an idling gear.

In addition, the rotation speed of "1.0" represents the same rotational speed as the input shaft IS. In addition, distances between the vertical lines of the first and second planetary gear sets PG1 and PG2 are set according to each gear ratio (teeth number of a sun gear/teeth number of a ring gear).

Hereinafter, referring to FIG. 2 and FIG. 3A to FIG. 3H, the shift processes of the planetary gear train according to the first exemplary embodiment of the present invention will be described in detail.

[First Forward Speed]

Referring to FIG. 2, the first clutch C1 and the first brake B1 are operated at the first forward speed 1ST.

Figure 3A:
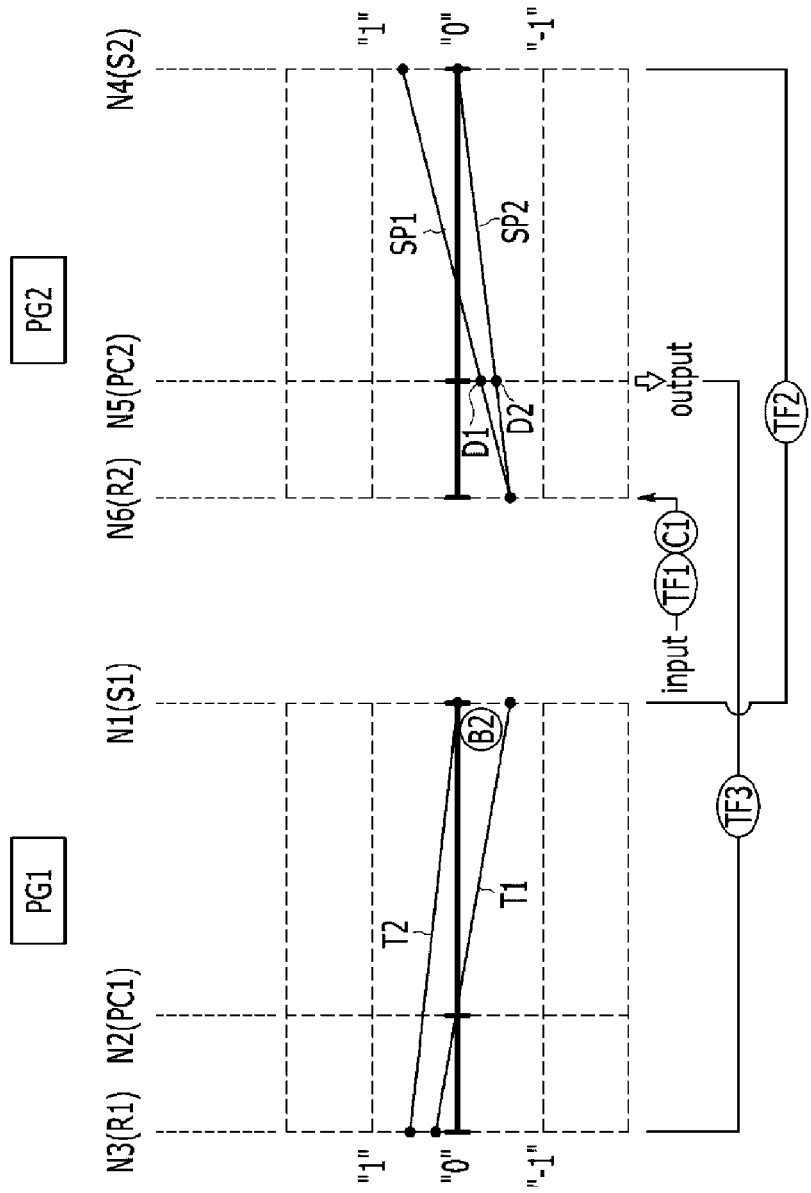
FIG. 3A is a lever diagram of a planetary gear train at the first forward speed and the second forward speed according to the various exemplary embodiments of the present invention.

As shown in FIG. 3A, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is changed according to the gear ratio of the first transfer gear TF1 and is then input to the sixth rotation element N6 by operation of the first clutch C1, and the second rotation element N2 is operated as a fixed element by operation of the first brake B1.

The rotation elements of the first planetary gear set PG1 form a first speed line T1 by operation of the first planetary gear set PG1 and the second planetary gear set PG2, and the rotation elements of the second planetary gear set PG2 form a first shift line SP1. Therefore, D1 is output through the fifth rotation element N5.

[Second Forward Speed]

The first brake B1 that was operated at the first forward speed 1ST is released and the second brake B2 is operated at the second forward speed 2ND.

As shown in FIG. 3A, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is changed according to the gear ratio of the first transfer gear TF1 and is then input to the sixth rotation element N6 by operation of the first clutch C1, and the first rotation element N1 is operated as a fixed element by operation of the second brake B2.

The rotation elements of the first planetary gear set PG1 form a second speed line T2 by operation of the first planetary gear set PG1 and the second planetary gear set PG2, and the rotation elements of the second planetary gear set PG2 form a second shift line SP2. Therefore, D2 is output through the fifth rotation element N5.

[Third Forward Speed]

The second brake B2 that was operated at the second forward speed 2ND is released and the second clutch C2 is operated at the third forward speed 3RD.

Figure 3B:
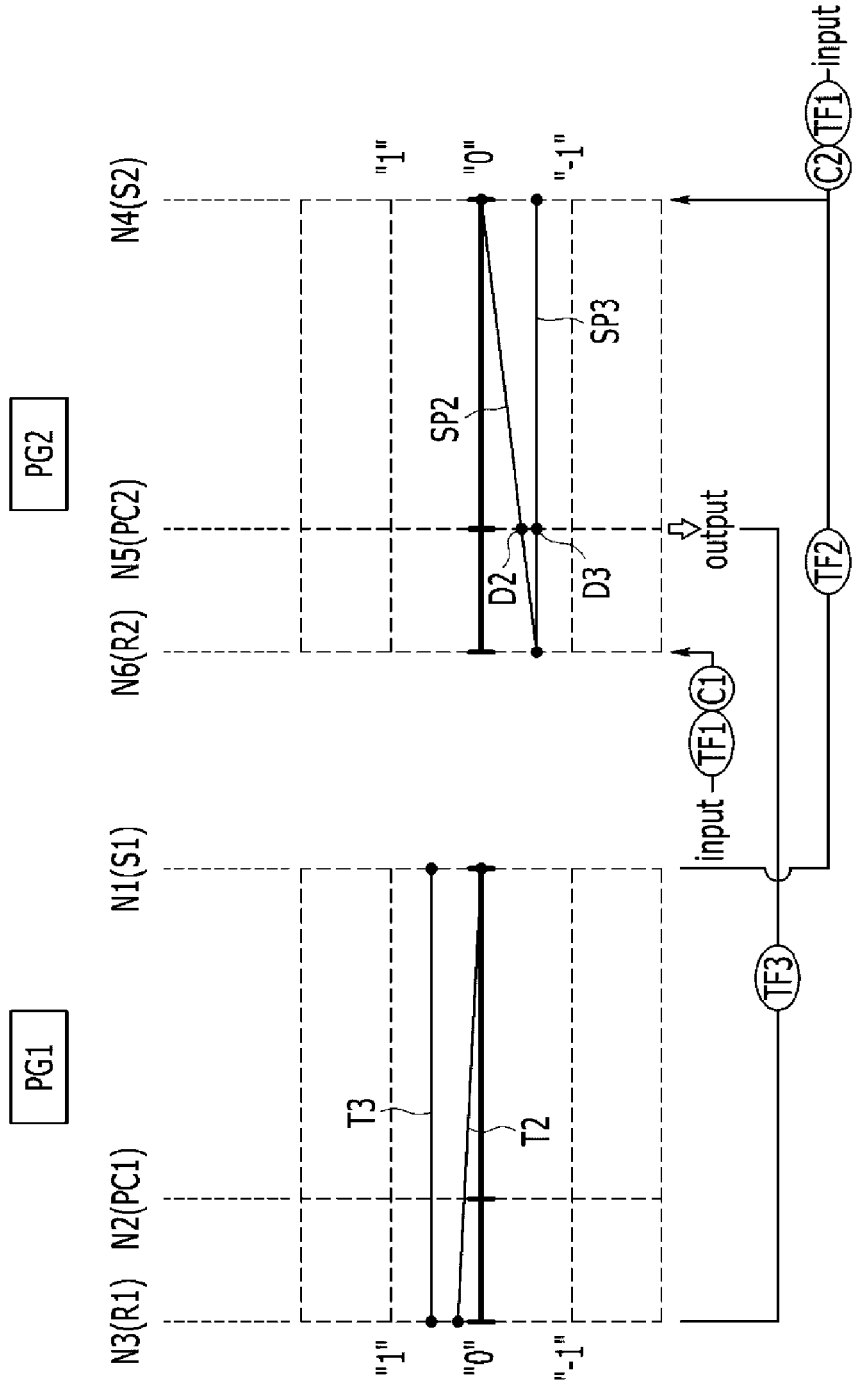
FIG. 3B is a lever diagram of a planetary gear train at the third forward speed according to the various exemplary embodiments of the present invention.

As shown in FIG. 3B, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is input to the sixth rotation element N6 and the fourth rotation element N4 according to the gear ratio of the first transfer gear TF1 by operation of the first clutch C1 and the second clutch C2.

The second planetary gear set PG2 becomes a direct-coupling state, the rotation elements of the first planetary gear set PG1 form a third speed line T3, and the rotation elements of the second planetary gear set PG2 form a third shift line SP3. Therefore, D3 is output through the fifth rotation element N5.

[Fourth Forward Speed]

The second clutch C2 that was operated at the third forward speed 3RD is released and the third clutch C3 is operated at the fourth forward speed 4TH.

Figure 3C:
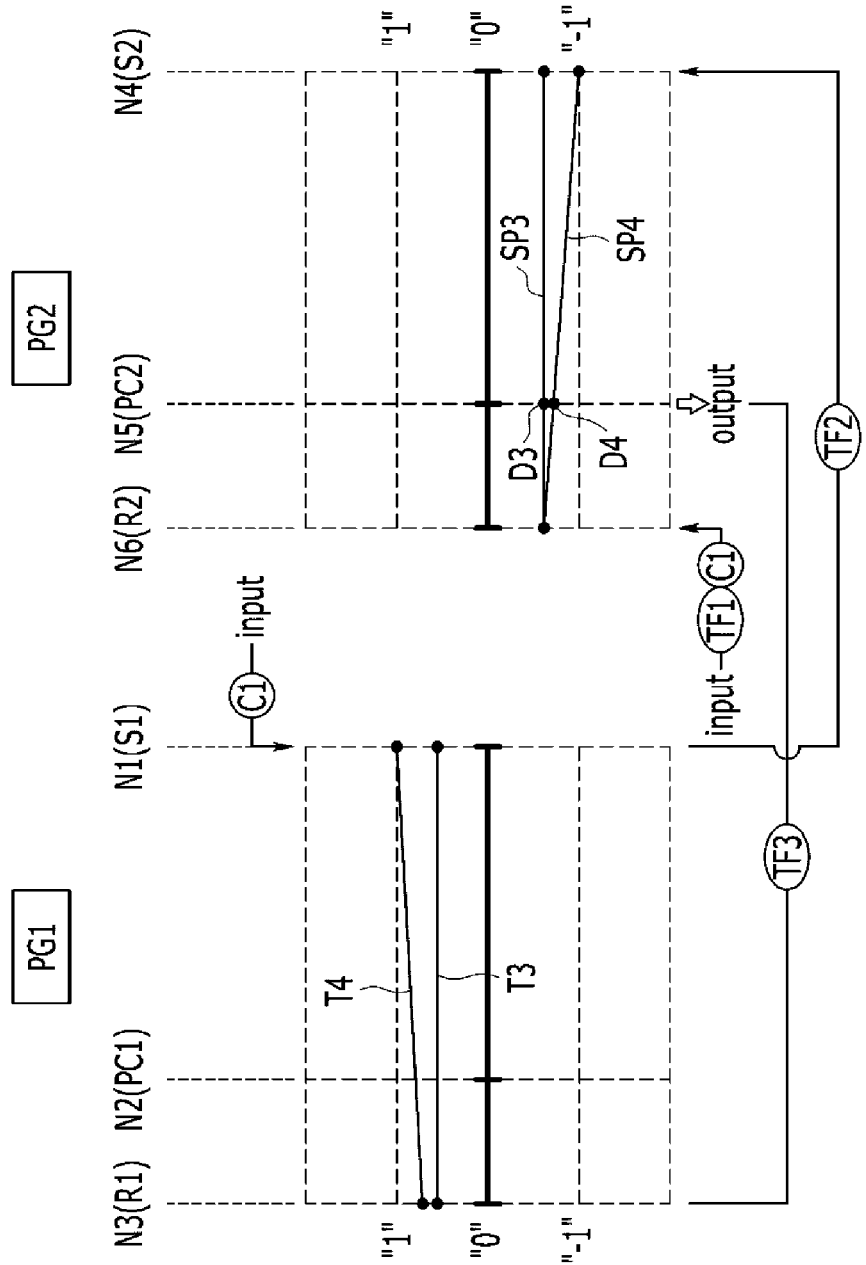
FIG. 3C is a lever diagram of a planetary gear train at the fourth forward speed according to the various exemplary embodiments of the present invention.

As shown in FIG. 3C, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is changed according to the gear ratio of the first transfer gear TF1 and is then input to the sixth rotation element N6 by operation of the first clutch C1, and the rotation speed of the input shaft IS is input to the first rotation element N1 by operation of the third clutch C3.

The rotation elements of the first planetary gear set PG1 form a fourth speed line T4 by operation of the first planetary gear set PG1 and the second planetary gear set PG2, and the rotation elements of the second planetary gear set PG2 form a fourth shift line SP4. Therefore, D4 is output through the fifth rotation element N5.

[Fifth Forward Speed]

The third clutch C3 that was operated at the fourth forward speed 4TH is released and the fourth clutch C4 is operated at the fifth forward speed 5TH.

Figure 3D:
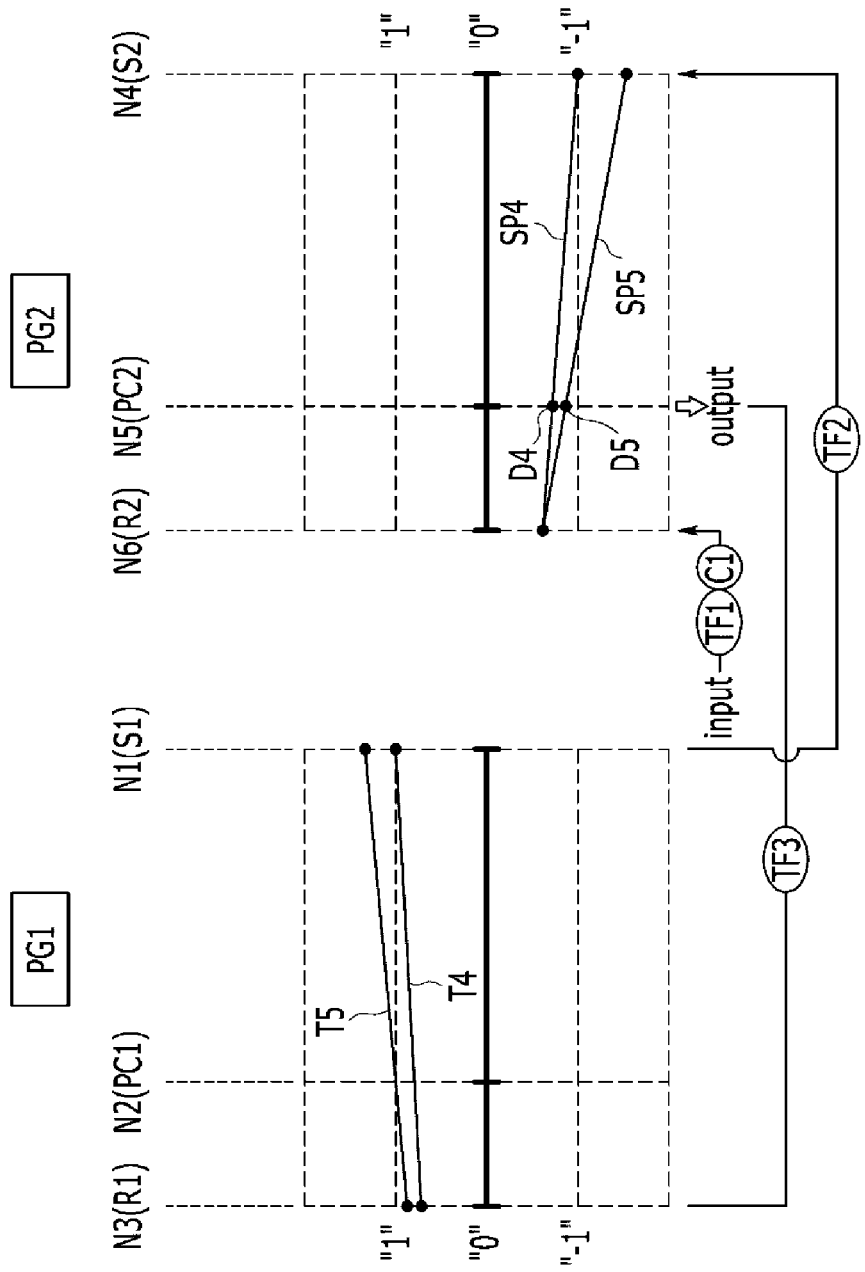
FIG. 3D is a lever diagram of a planetary gear train at the fifth forward speed according to the various exemplary embodiments of the present invention.

As shown in FIG. 3D, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is changed according to the gear ratio of the first transfer gear TF1 and is then input to the sixth rotation element N6 by operation of the first clutch C1, and the rotation speed of the input shaft IS is input to the second rotation element N2 by operation of the fourth clutch C4.

The rotation elements of the first planetary gear set PG1 form a fifth speed line T5 by operation of the first planetary gear set PG1 and the second planetary gear set PG2, and the rotation elements of the second planetary gear set PG2 form a fifth shift line SP5. Therefore, D5 is output through the fifth rotation element N5.

[Sixth Forward Speed]

The first clutch C1 that was operated at the fifth forward speed 5TH is released and the third clutch C3 is operated at the sixth forward speed 6TH.

Figure 3E:
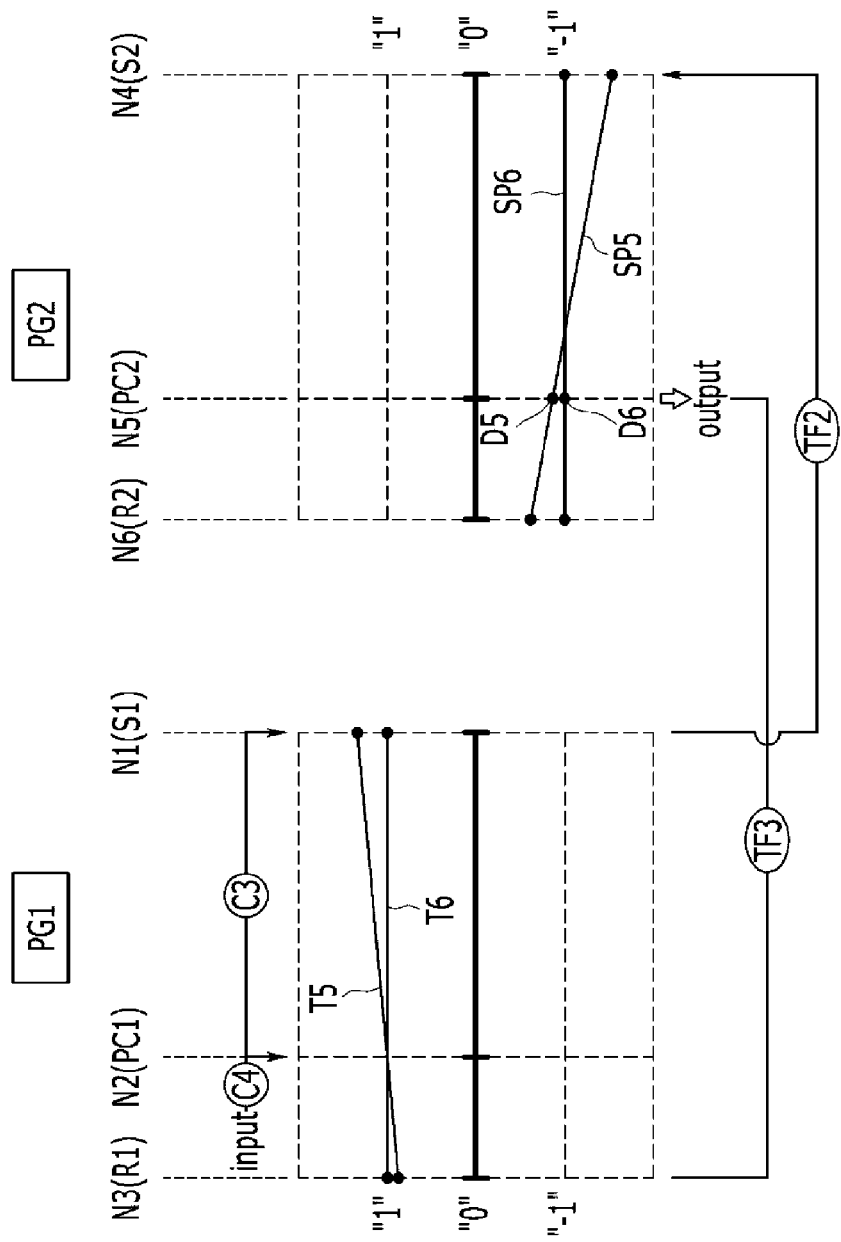
FIG. 3E is a lever diagram of a planetary gear train at the sixth forward speed according to the various exemplary embodiments of the present invention.

As shown in FIG. 3E, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is input to the first rotation element N1 and the second rotation element N2 by operation of the third clutch C3 and the fourth clutch C4.

Therefore, both of the first planetary gear set PG1 and the second planetary gear set PG2 become direct-coupling states, the rotation elements of the first planetary gear set PG1 form a sixth speed line T6, and the rotation elements of the second planetary gear set PG2 form a sixth shift line SP6. Therefore, D6 is output through the fifth rotation element N5.

[Seventh Forward Speed]

The third clutch C3 that was operated at the sixth forward speed 6TH is released and the second clutch C2 is operated at the seventh forward speed 7TH.

Figure 3F:
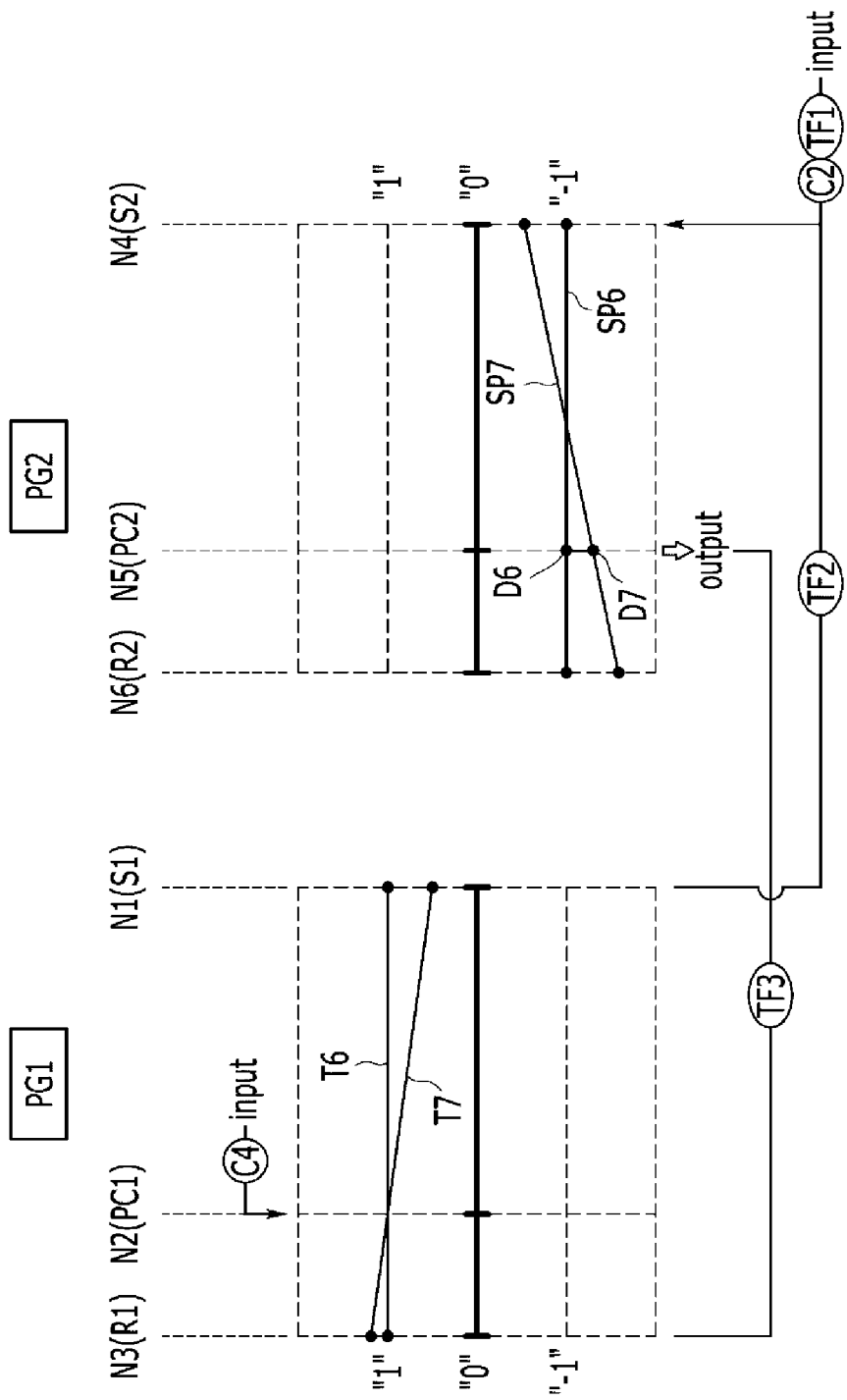
FIG. 3F is a lever diagram of a planetary gear train at the seventh forward speed according to the various exemplary embodiments of the present invention.

As shown in FIG. 3F, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is changed according to the gear ratio of the first transfer gear TF1 and is then input to the fourth rotation element N4 by operation of the second clutch C2, and the rotation speed of the input shaft IS is input to the second rotation element N2 by operation of the fourth clutch C4.

The rotation elements of the first planetary gear set PG1 form a seventh speed line T7 by operation of the first planetary gear set PG1 and the second planetary gear set PG2, and the rotation elements of the second planetary gear set PG2 form a seventh shift line SP7. Therefore, D7 is output through the fifth rotation element N5.

[Eighth Forward Speed]

The second clutch C2 that was operated at the seventh forward speed 7TH is released and the second brake B2 is operated at the eighth forward speed 8TH.

As shown in FIG. 3G, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is input to the second rotation element N2 by operation of the fourth clutch C4, and the first rotation element N1 is operated as a fixed element by operation of the second brake B2.

The rotation elements of the first planetary gear set PG1 form an eighth speed line T8 by operation of the first planetary gear set PG1 and the second planetary gear set PG2, and the rotation elements of the second planetary gear set PG2 form an eighth shift line SP8. Therefore, D8 is output through the fifth rotation element N5.

[Reverse Speed]

As shown in FIG. 2, the second clutch C2 and the first brake B1 are operated at the reverse speed REV.

Figure 3H:
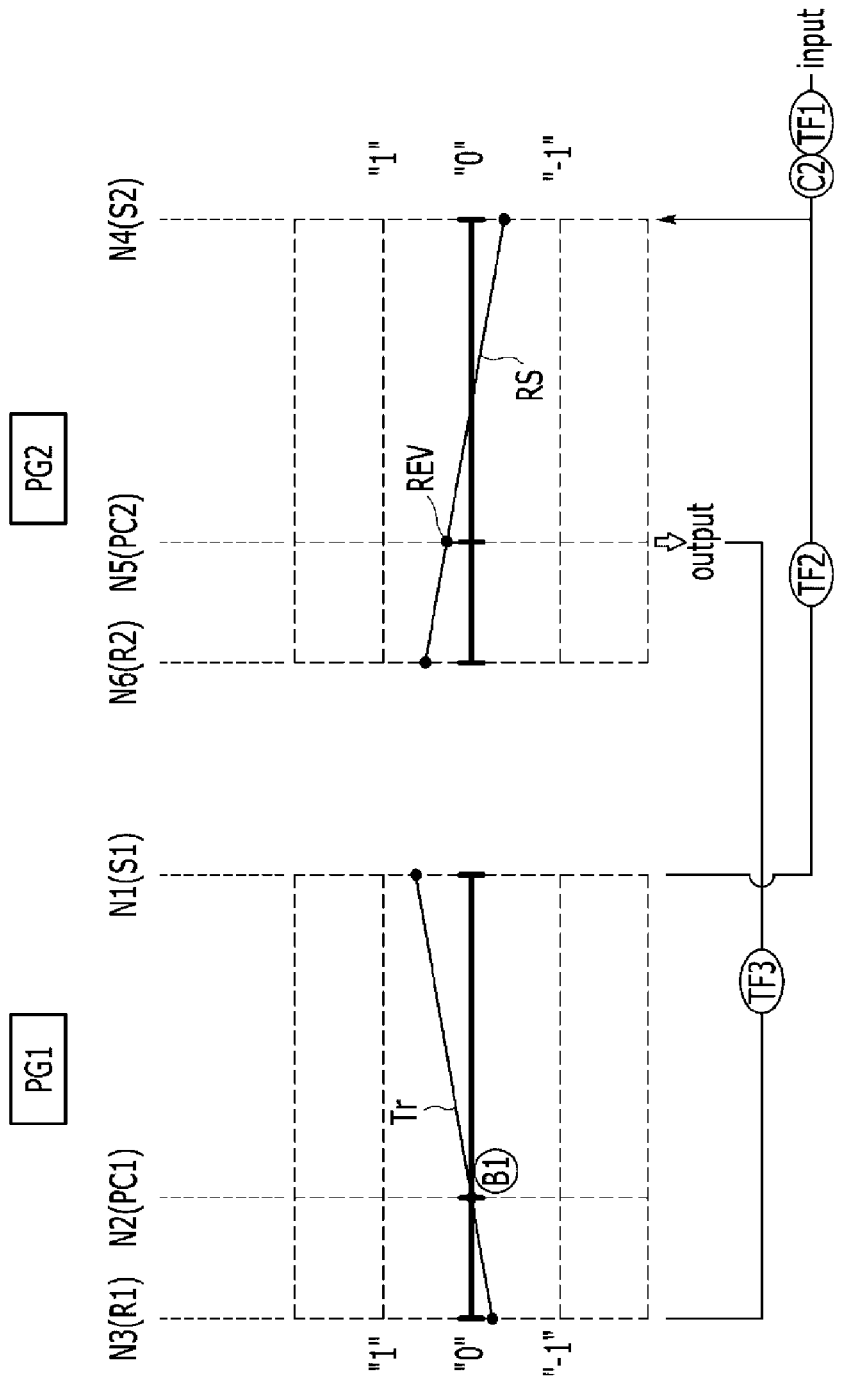
FIG. 3H is a lever diagram of a planetary gear train at a reverse speed according to the various exemplary embodiments of the present invention.

As shown in FIG. 3H, the first rotation element N1 is directly connected to the fourth rotation element N4 through the second transfer gear TF2, and the third rotation element N3 is directly connected to the fifth rotation element N5 through the third transfer gear TF3.

In addition, the rotation speed of the input shaft IS is changed according to the gear ratio of the first transfer gear TF1 and is then input to the fourth rotation element N4 by operation of the second clutch C2, and the second rotation element N2 is operated as a fixed element by operation of the first brake B1.

The rotation elements of the first planetary gear set PG1 form a reverse speed line Tr by operation of the first planetary gear set PG1 and the second planetary gear set PG2, and the rotation elements of the second planetary gear set PG2 form a reverse shift line RS. Therefore, REV is output through the fifth rotation element N5.

As described above, the planetary gear train according to the first exemplary embodiment of the present invention can achieve the eighth forward speeds and one reverse speed by combining two planetary gear sets PG1 and PG2 that are simple planetary gear sets, three externally-meshed gears TF1, TF2, and TF3, and six friction elements C1, C2, C3, C4, B1, and B2.

In addition, optimum gear ratios may be achieved due to ease of changing gear ratios by using three external-meshing gears as well as the planetary gear sets. Since gear ratios can be changed according to target performance, acceleration performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

Figure 4:
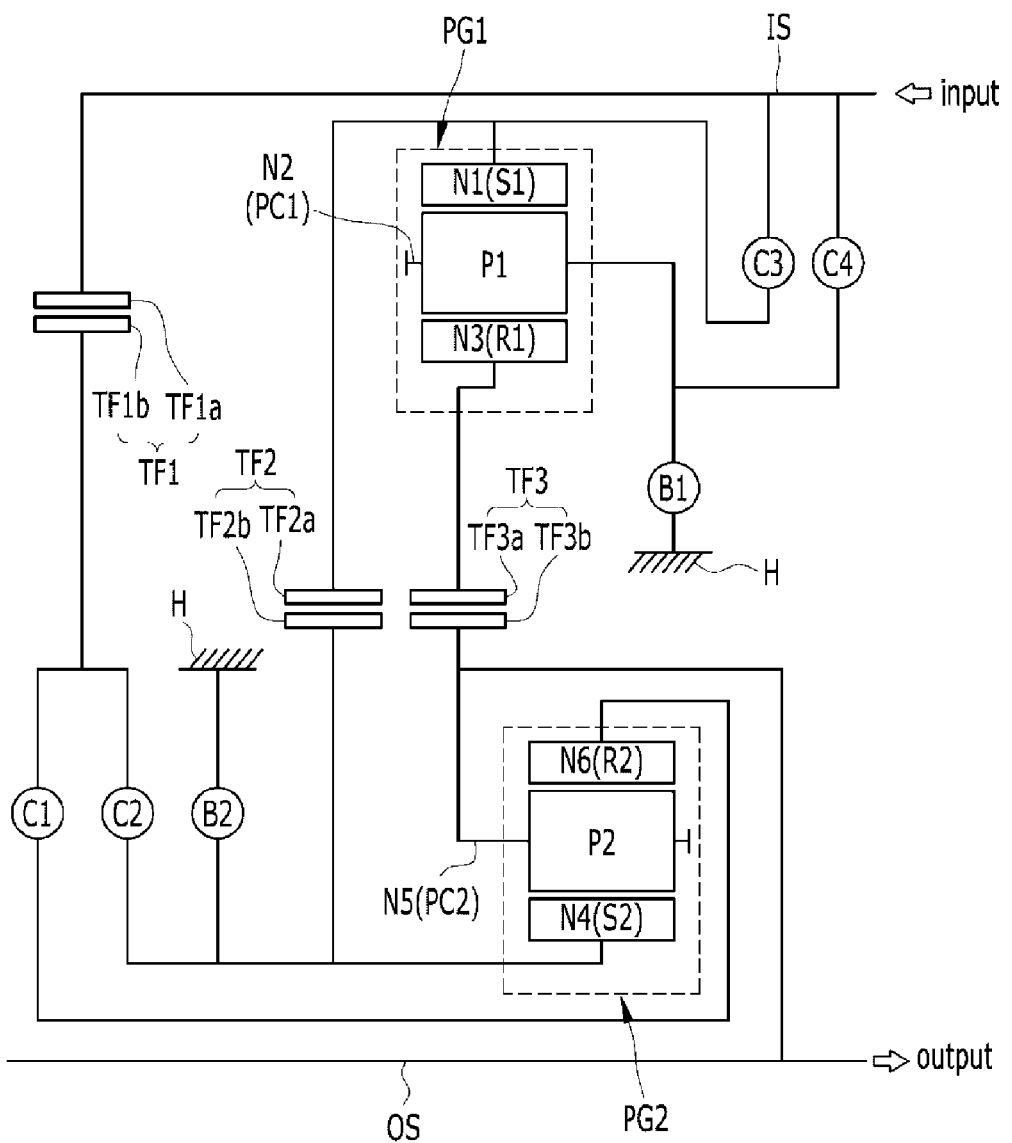
FIG. 4 is a schematic diagram of a planetary gear train according to the various exemplary embodiments of the present invention.

FIG. 4 is a schematic diagram of a planetary gear train according to the second exemplary embodiment of the present invention.

Referring to FIG. 4, the second brake B2 is disposed between the first rotation element N1 and the transmission housing H in the first exemplary embodiment, but the second brake B2 is disposed between the fourth rotation element N4 and the transmission housing H in the second exemplary embodiment.

Since components and functions of the second exemplary embodiment are the same as those of the first exemplary embodiment except a position of the second brake B2, detailed description thereof will be omitted.

Figure 5:
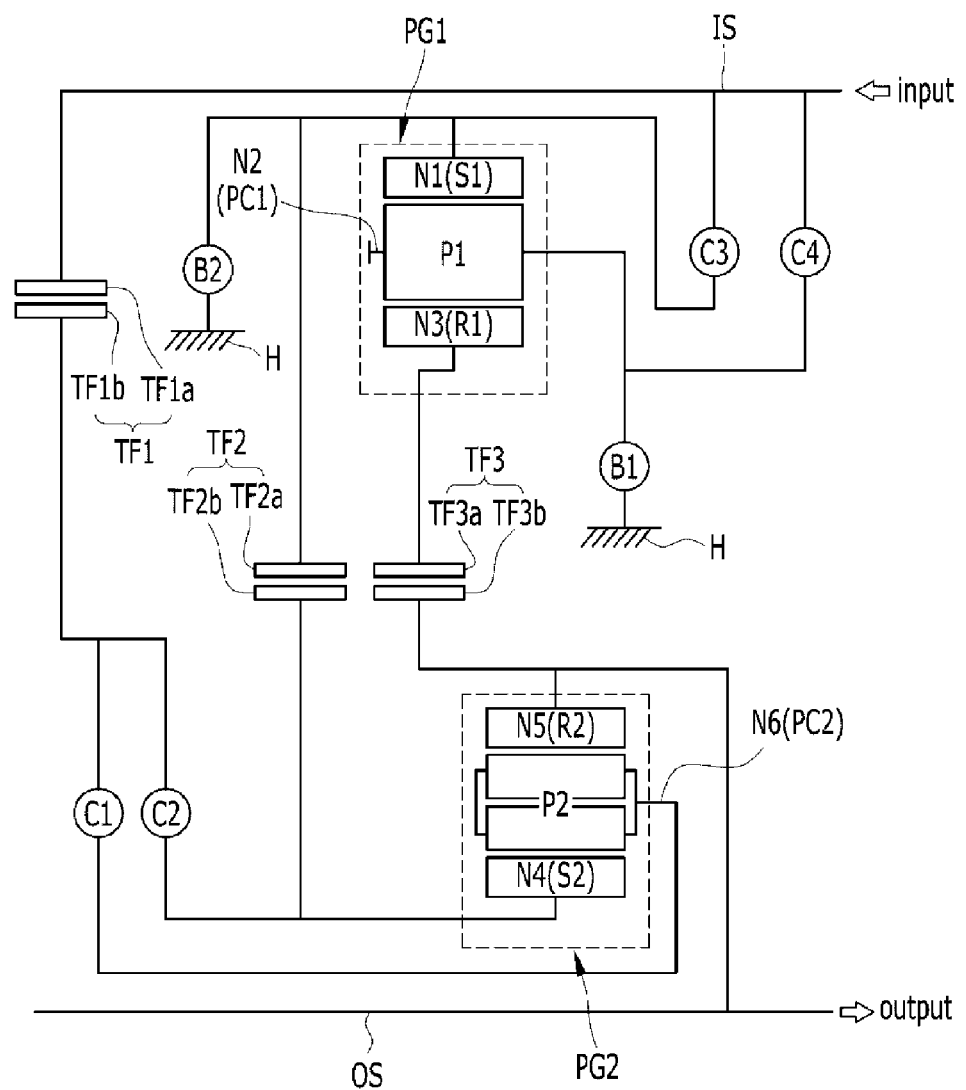
FIG. 5 is a schematic diagram of a planetary gear train according to the various exemplary embodiments of the present invention.

FIG. 5 is a schematic diagram of a planetary gear train according to the third exemplary embodiment of the present invention.

Referring to FIG. 5, the second planetary gear set PG2 is the single pinion planetary gear set in the first exemplary embodiment, but the second planetary gear set PG2 is a double pinion planetary gear set in the third exemplary embodiment.

Therefore, the fifth rotation element N5 is changed from the second planet carrier PC2 to the second ring gear R2, and the sixth rotation element N6 is changed from the second ring gear R2 to the second planet carrier PC2.

Since functions of the third exemplary embodiment is the same as that of the first exemplary embodiment except rotation elements included in the fifth and sixth rotation elements N5 and N6, detailed description thereof will be omitted.

The an exemplary embodiments of the present invention can achieve eight forward speeds and one reverse speed by combining two planetary gear sets, three transfer gears and six frictional elements.

In addition, since two planetary gear sets are separately disposed on the input shaft and the output shaft disposed apart from and in parallel with each other, a length from front to end of the gear train may be reduced and mountability may be improved.

In addition, optimum gear ratios may be achieved due to ease of changing gear ratios by using three external-meshing gears as well as the planetary gear sets. Since gear ratios can be changed according to target performance, acceleration performance, power delivery performance, and fuel economy may be improved. Therefore, a start-up clutch instead of a torque converter may be used.

In addition, two friction elements are operated at each shift-speed, and one friction element is released and another friction element is operated so as to shift to a neighboring shift-speed. Therefore, shift control condition is fully satisfied.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
    an input shaft receiving torque of an engine;
    an output shaft outputting changed torque;
    a first planetary gear set disposed on the input shaft, and including:
        a first rotation element selectively connected to the input shaft or a transmission housing;
        a second rotation element selectively connected to the input shaft or the transmission housing; and
        a third rotation element connected to the output shaft;
    a second planetary gear set disposed on the output shaft, and including:
        a fourth rotation element selectively connected to the input shaft and connected to the first rotation element;
        a fifth rotation element connected to the third rotation element and directly connected to the output shaft; and
        a sixth rotation element selectively connected to the input shaft;
    three transfer gears meshing externally the fourth, fifth, and sixth rotation elements of the second planetary gear set with the input shaft and the first and third rotation elements; and
    six frictional elements including four clutches selectively connecting the first, second, fourth, and sixth rotation elements to the input shaft and two brakes selectively connecting the first and second rotation elements to the transmission housing respectively.

2. The planetary gear train of claim 1,
    wherein the first planetary gear set is a single pinion planetary gear set wherein the first rotation element is a first sun gear, the second rotation element is a first planet carrier, and the third rotation element is a first ring gear, and wherein the second planetary gear set is a single pinion planetary gear set wherein the fourth rotation element is a second sun gear, the fifth rotation element is a second planet carrier, and the sixth rotation element is a second ring gear.

3. The planetary gear train of claim 2, wherein the three transfer gears comprise:
   a first transfer gear including a first transfer drive gear connected to the input shaft and a first transfer driven gear selectively connected to the fourth or sixth rotation elements;
   a second transfer gear including a second transfer drive gear connected to the first rotation element and a second transfer driven gear connected to the fourth rotation element; and
   a third transfer gear including a third transfer drive gear connected to the third rotation element and a third transfer driven gear connected to the fifth rotation element.

4. The planetary gear train of claim 3, wherein the third transfer gear is connected to the output shaft.

5. The planetary gear train of claim 3, wherein the six frictional elements comprise:
   a first clutch disposed between the sixth rotation element and the first transfer gear;
   a second clutch disposed between the fourth rotation element and the first transfer gear;
   a third clutch disposed between the input shaft and the first rotation element;
   a fourth clutch disposed between the input shaft and the second rotation element;
   a first brake disposed between the second rotation element and the transmission housing; and
   a second brake disposed between the first rotation element and the transmission housing.

6. The planetary gear train of claim 5, wherein the second brake is disposed between the second transfer gear and the transmission housing.

7. The planetary gear train of claim 5, wherein a first forward speed is achieved by operating the first clutch and the first brake,
   a second forward speed is achieved by operating the first clutch and the second brake,
   a third forward speed is achieved by operating the first clutch and the second clutch,
   a fourth forward speed is achieved by operating the first clutch and the third clutch,
   a fifth forward speed is achieved by operating the first clutch and the fourth clutch,
   a sixth forward speed is achieved by operating the third clutch and the fourth clutch,
   a seventh forward speed is achieved by operating the second clutch and the fourth clutch,
   an eighth forward speed is achieved by operating the fourth clutch and the second brake, and
   a reverse speed is achieved by operating the second clutch and the first brake.

8. The planetary gear train of claim 3, wherein the six frictional elements comprise:
   a first clutch disposed between the sixth rotation element and the first transfer gear;
   a second clutch disposed between the fourth rotation element and the first transfer gear;
   a third clutch disposed between the input shaft and the first rotation element;
   a fourth clutch disposed between the input shaft and the second rotation element;
   a first brake disposed between the second rotation element and the transmission housing; and
   a second brake disposed between the fourth rotation element and the transmission housing.

9. The planetary gear train of claim 1, wherein the first planetary gear set is a single pinion planetary gear set wherein the first rotation element is a first sun gear, the second rotation element is a first planet carrier, and the third rotation element is a first ring gear, and
   the second planetary gear set is a double pinion planetary gear set wherein the fourth rotation element is a second sun gear, the fifth rotation element is a second ring gear, and the sixth rotation element is a second planet carrier.

10. A planetary gear train of an automatic transmission for a vehicle, comprising:
    an input shaft receiving torque of an engine;
    an output shaft outputting changed torque;
    a first planetary gear set disposed on the input shaft, and including:
      a first rotation element selectively connected to the input shaft or a transmission housing;
      a second rotation element selectively connected to the input shaft or the transmission housing; and
      a third rotation element connected to the output shaft;
    a second planetary gear set disposed on the output shaft, and including:
      a fourth rotation element selectively connected to the input shaft and connected to the first rotation element;
      a fifth rotation element connected to the third rotation element and directly connected to the output shaft; and
      a sixth rotation element selectively connected to the input shaft;
    a first transfer gear including a first transfer drive gear connected to the input shaft and a first transfer driven gear selectively connected to the fourth or sixth rotation elements;
    a second transfer gear including a second transfer drive gear connected to the first rotation element and a second transfer driven gear connected to the fourth rotation element;
    a third transfer gear including a third transfer drive gear connected to the third rotation element and a third transfer driven gear connected to the fifth rotation element;
    a first clutch disposed between the sixth rotation element and the first transfer gear;
    a second clutch disposed between the fourth rotation element and the first transfer gear;
    a third clutch disposed between the input shaft and the first rotation element;
    a fourth clutch disposed between the input shaft and the second rotation element;
    a first brake disposed between the second rotation element and the transmission housing; and
    a second brake disposed between the first rotation element and the transmission housing.

11. The planetary gear train of claim 10, wherein the third transfer driven gear is connected to the output shaft.

12. The planetary gear train of claim 10, wherein the first planetary gear set is a single pinion planetary gear set wherein the first rotation element is a first sun gear, the second rotation element is a first planet carrier, and the third rotation element is a first ring gear, and
    the second planetary gear set is a single pinion planetary gear set wherein the fourth rotation element is a second sun gear, the fifth rotation element is a second planet carrier, and the sixth rotation element is a second ring gear.

13. The planetary gear train of claim 10, wherein the first planetary gear set is a single pinion planetary gear set wherein the first rotation element is a first sun gear, the second rotation element is a first planet carrier, and the third rotation element is a first ring gear, and the second planetary gear set is a double pinion planetary gear set wherein the fourth rotation element is a second sun gear, the fifth rotation element is a second ring gear, and the sixth rotation element is a second planet carrier.

14. The planetary gear train of claim 10, wherein a first forward speed is achieved by operating the first clutch and the first brake, a second forward speed is achieved by operating the first clutch and the second brake, a third forward speed is achieved by operating the first clutch and the second clutch, a fourth forward speed is achieved by operating the first clutch and the third clutch, a fifth forward speed is achieved by operating the first clutch and the fourth clutch, a sixth forward speed is achieved by operating the third clutch and the fourth clutch, a seventh forward speed is achieved by operating the second clutch and the fourth clutch, an eighth forward speed is achieved by operating the fourth clutch and the second brake, and a reverse speed is achieved by operating the second clutch and the first brake.

15. A planetary gear train of an automatic transmission for a vehicle, comprising:

an input shaft receiving torque of an engine;

an output shaft outputting changed torque;

a first planetary gear set disposed on the input shaft, and including:
  a first rotation element selectively connected to the input shaft or a transmission housing;
  a second rotation element selectively connected to the input shaft or the transmission housing; and
  a third rotation element connected to the output shaft;

a second planetary gear set disposed on the output shaft, and including:
  a fourth rotation element selectively connected to the input shaft and connected to the first rotation element;
  a fifth rotation element connected to the third rotation element and directly connected to the output shaft; and
  a sixth rotation element selectively connected to the input shaft;

a first transfer gear including a first transfer drive gear connected to the input shaft and a first transfer driven gear selectively connected to the fourth or sixth rotation elements;

a second transfer gear including a second transfer drive gear connected to the first rotation element and a second transfer driven gear connected to the fourth rotation element; and a third transfer gear including a third transfer drive gear connected to the third rotation element and a third transfer driven gear connected to the fifth rotation element;

a first clutch disposed between the sixth rotation element and the first transfer gear;

a second clutch disposed between the fourth rotation element and the first transfer gear;

a third clutch disposed between the input shaft and the first rotation element;

a fourth clutch disposed between the input shaft and the second rotation element;

a first brake disposed between the second rotation element and the transmission housing; and a second brake disposed between the fourth rotation element and the transmission housing.

16. The planetary gear train of claim 15, wherein the third transfer driven gear is connected to the output shaft.

17. The planetary gear train of claim 15, wherein the first planetary gear set is a single pinion planetary gear set wherein the first rotation element is a first sun gear, the second rotation element is a first planet carrier, and the third rotation element is a first ring gear, and the second planetary gear set is a single pinion planetary gear set wherein the fourth rotation element is a second sun gear, the fifth rotation element is a second planet carrier, and the sixth rotation element is a second ring gear.

18. The planetary gear train of claim 15, wherein the first planetary gear set is a single pinion planetary gear set wherein the first rotation element is a first sun gear, the second rotation element is a first planet carrier, and the third rotation element is a first ring gear, and the second planetary gear set is a double pinion planetary gear set wherein the fourth rotation element is a second sun gear, the fifth rotation element is a second ring gear, and the sixth rotation element is a second planet carrier.

19. The planetary gear train of claim 15, wherein a first forward speed is achieved by operating the first clutch and the first brake, a second forward speed is achieved by operating the first clutch and the second brake, a third forward speed is achieved by operating the first clutch and the second clutch, a fourth forward speed is achieved by operating the first clutch and the third clutch, a fifth forward speed is achieved by operating the first clutch and the fourth clutch, a sixth forward speed is achieved by operating the third clutch and the fourth clutch, a seventh forward speed is achieved by operating the second clutch and the fourth clutch, an eighth forward speed is achieved by operating the fourth clutch and the second brake, and a reverse speed is achieved by operating the second clutch and the first brake.

* * * * *